United States Patent
Zinser et al.

(10) Patent No.: US 9,774,440 B2
(45) Date of Patent: Sep. 26, 2017

(54) SYSTEMS AND METHODS FOR REAL-TIME OPERATION OF SOFTWARE RADIO FREQUENCY CANCELLER

(71) Applicant: General Electric Company, Schenectady, NY (US)

(72) Inventors: Richard Louis Zinser, Niskayuna, NY (US); Michael Joseph Dell'Anno, Niskayuna, NY (US)

(73) Assignee: General Electricity Company, Schenectady, NY (US)

( * ) Notice: Subject to any disclaimer, the term of this patent is extended or adjusted under 35 U.S.C. 154(b) by 160 days.

(21) Appl. No.: 14/941,376

(22) Filed: Nov. 13, 2015

(65) Prior Publication Data

US 2017/0141910 A1    May 18, 2017

(51) Int. Cl.
H04L 12/50    (2006.01)
H04L 5/14     (2006.01)
H04B 1/00     (2006.01)

(52) U.S. Cl.
CPC ......... H04L 5/1461 (2013.01); H04B 1/0017 (2013.01)

(58) Field of Classification Search
CPC ..................................................... H04B 7/005
USPC ........................................................ 370/278
See application file for complete search history.

(56) References Cited

U.S. PATENT DOCUMENTS

| | | | |
|---|---|---|---|
| 8,199,681 B2 | 6/2012 | Zinser et al. | |
| 8,315,630 B2 | 11/2012 | Zinser et al. | |
| 8,379,584 B2 | 2/2013 | Hartman et al. | |
| 8,521,520 B2 | 8/2013 | Zinser et al. | |
| 8,688,046 B2 | 4/2014 | Hershey et al. | |
| 8,688,124 B2 | 4/2014 | Zinser et al. | |
| 8,787,571 B2 | 7/2014 | Ross et al. | |
| 9,030,921 B2 | 5/2015 | Ross et al. | |
| 9,130,747 B2 | 9/2015 | Zinser et al. | |
| 2010/0150032 A1* | 6/2010 | Zinser ................... | H04B 1/525 370/277 |
| 2010/0217677 A1 | 8/2010 | Hershey et al. | |
| 2010/0243646 A1 | 9/2010 | Hershey et al. | |
| 2011/0171960 A1 | 7/2011 | Hershey et al. | |
| 2011/0249596 A1* | 10/2011 | Ross ....................... | H04L 5/14 370/276 |
| 2014/0286489 A1 | 9/2014 | Ross et al. | |
| 2015/0213827 A1 | 7/2015 | Ross et al. | |

* cited by examiner

*Primary Examiner* — Dang Ton
(74) *Attorney, Agent, or Firm* — Jean K. Testa; Fletcher Yoder, P.C.

(57) ABSTRACT

A full-duplex RF communication system and corresponding methods use digital adaptive filters for interference cancellation. As provided, the techniques allow full-duplex radio frequency communication without frequency-, time-, or code-division multiplexing and without the use of hardware RF cancellers, in real-time. Such techniques may be useful for wireless communication, such a cellular communication, radio communication, broadcasting, short-range point-to-point communication, wireless sensor networks, and wireless computer networks.

25 Claims, 5 Drawing Sheets

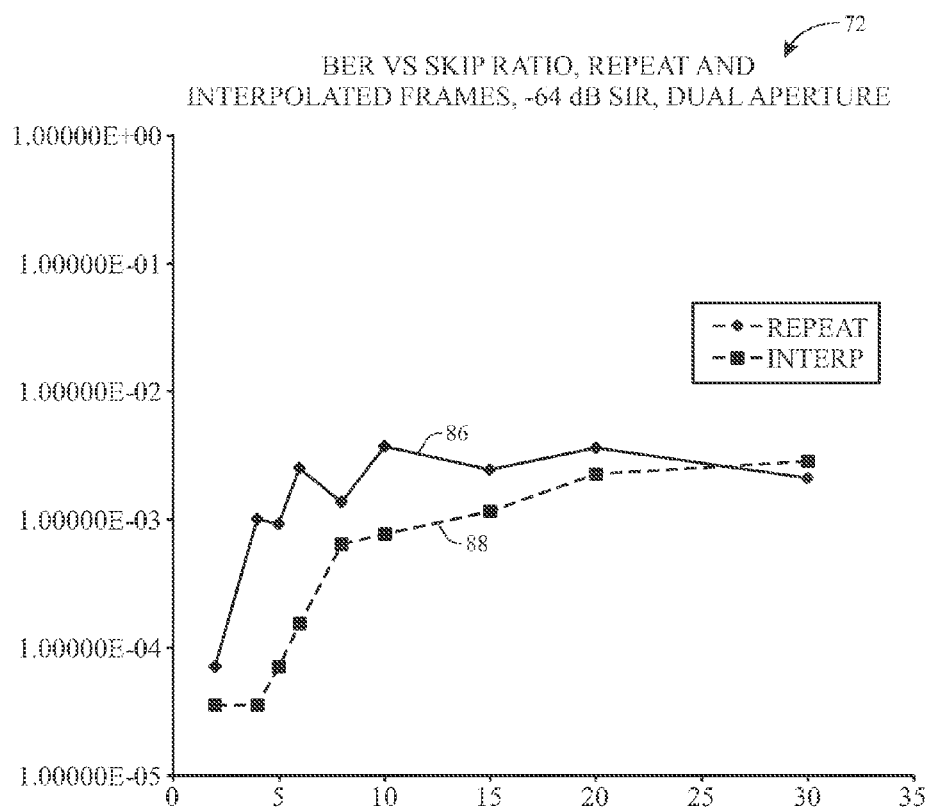
FIG. 6
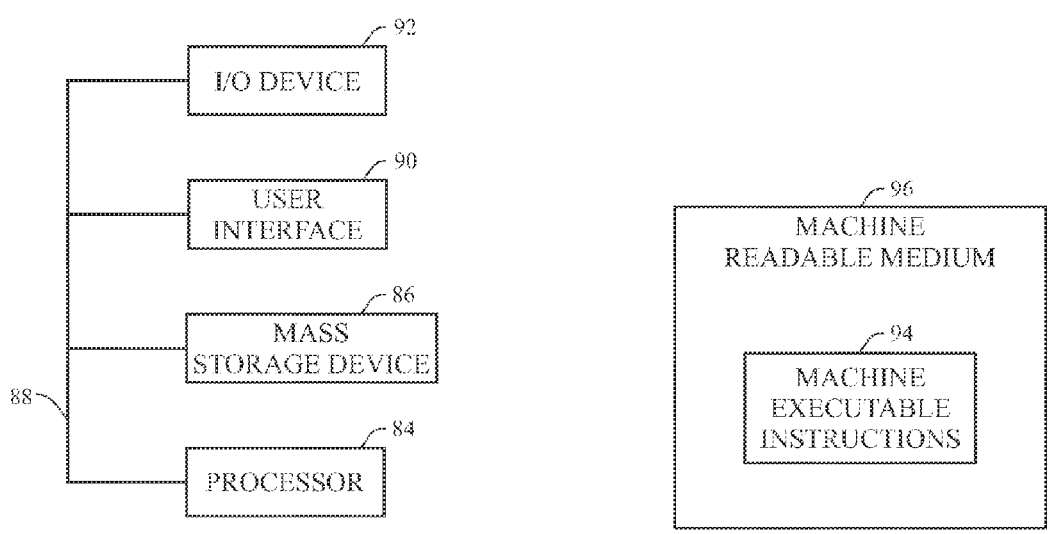
FIG. 7
FIG. 8

SYSTEMS AND METHODS FOR REAL-TIME OPERATION OF SOFTWARE RADIO FREQUENCY CANCELLER

BACKGROUND

The subject matter described herein generally relates to radio frequency (RF) interference cancellation. Specifically, the embodiments herein relating to real-time RF interference cancellation.

A two-way RF communication system is one in which signals are transmitted bi-directionally between transceivers. Each transceiver may include a transmitter to transmit signals and a receiver to receive incoming transmissions. To avoid interference between the transmitted signal and the received signal, the communication system may receive and transmit signals at different times in what is called half-duplex communication. However, half-duplex techniques may not allow efficient two-way communication because transmitting time is lost while signals are being received.

Full-duplex techniques allow signals to be transmitted and received simultaneously, providing increased bandwidth relative to half-duplex techniques. To avoid interference between the transmitted and received signals, full-duplex techniques may employ various strategies to separate these signals from one another. For example, full-duplex communication may employ time-division multiplexing (TDM), frequency-division multiplexing (FDM), or code-division multiplexing (CDM). In TDM, the transmitted and received signals may be transferred in different timeslots, but at a fast enough rate that the transferring appears to be simultaneous. In FDM, the transmitted and received signals may be separated enough in frequency that their modulated spectra do not overlap, and each receiver may be tuned such that it will receive the intended frequency and reject its own transmitted signal. In CDM, the signals may carry certain codes that allow certain signals to be separated from other signals.

There are various techniques for RF interference cancellation that may be employed in a particular system. For example, certain duplex communication architectures may employ hardware RF cancellers. Often, the hardware RF canceller may not provide adequate canceling, and these systems may also use an additional canceller at baseband. Accordingly, such hardware-based canceling systems may be complex and may involve multiple cancellation filters. Other architectures may employ full-band cancellers that may cancel transmission components over the entire Nyquist bandwidth. However, such cancellers may not operate in real-time, due to the extensive computational requirements.

BRIEF DESCRIPTION

In a first embodiment, there is a method provided. The method includes converting an analog primary signal into a digital primary signal comprising a plurality of primary data frames. The method further includes converting an analog reference signal into a digital reference signal comprising a plurality of reference data frames, wherein each of the plurality of reference data frames corresponds to one of the plurality of primary data frames. The method also includes processing the digital reference signal with a digital adaptive filter, wherein the digital adaptive filter uses the digital reference signal and the digital primary signal as inputs for determining tap weight values of the digital adaptive filter to provide an output and wherein a tap weight estimator calculates the tap weight values for only a subset of the plurality of reference data frames and a corresponding subset of the plurality of the primary data frames. The method further includes subtracting the output of the digital adaptive filter from the digital primary signal to generate a digital cancelled signal.

In a second embodiment, there is a method provided. The method includes transmitting, from one or more analog-to-digital converters, one or more digital signals collectively comprising a plurality of data frames. The method further includes calculating, using a tap weight estimator, tap weight values for only a subset of the plurality of data frames. The method also includes estimating, using the tap weight estimator, a tap weight value for each of the plurality of data frames not in the subset. The method further includes generating, using a digital adaptive filter, a digital cancelled signal using the calculated tap weight values and the estimated tap weight values.

In a third embodiment, there is a full-duplex wireless communication system provided. The system includes a receiver front end, an antenna, or a receiver input port capable of receiving an analog primary signal. The system also includes a transmitter capable of transmitting an analog transmitted signal. The system further includes a directional coupler capable of sampling a portion of the analog transmitted signal to provide an analog reference signal. They system further includes a first analog to digital converter capable of converting the analog primary signal into a digital primary signal. The system also includes a second analog to digital converter capable of converting the analog reference signal into a digital reference signal. The system further includes an adaptive filter configured to process the digital reference signal. The system also includes a tap weight estimator coupled to the adaptive filter and configured to use the digital reference and primary signals as inputs for calculating tap weight values of the adaptive filter to provide an output, wherein the system is configured such that the tap weight estimator calculates only a portion of the tap weight values for the digital reference and primary signals. The system additionally includes a summer configured to subtract the output of the adaptive filter from the digital primary signal to generate a digital cancelled signal.

DRAWINGS

These and other features, aspects, and advantages of the present invention will become better understood when the following detailed description is read with reference to the accompanying drawings in which like characters represent like parts throughout the drawings, wherein:

FIG. 6 illustrates a plot of test results using the disclosed techniques and the test system of FIG. 5;

FIG. 7 illustrates hardware implementation of the present techniques, in accordance with an embodiment of the present invention; and FIG. 8 illustrates a software implementation, in accordance with an embodiment of the present invention.

DETAILED DESCRIPTION

Figure 1:
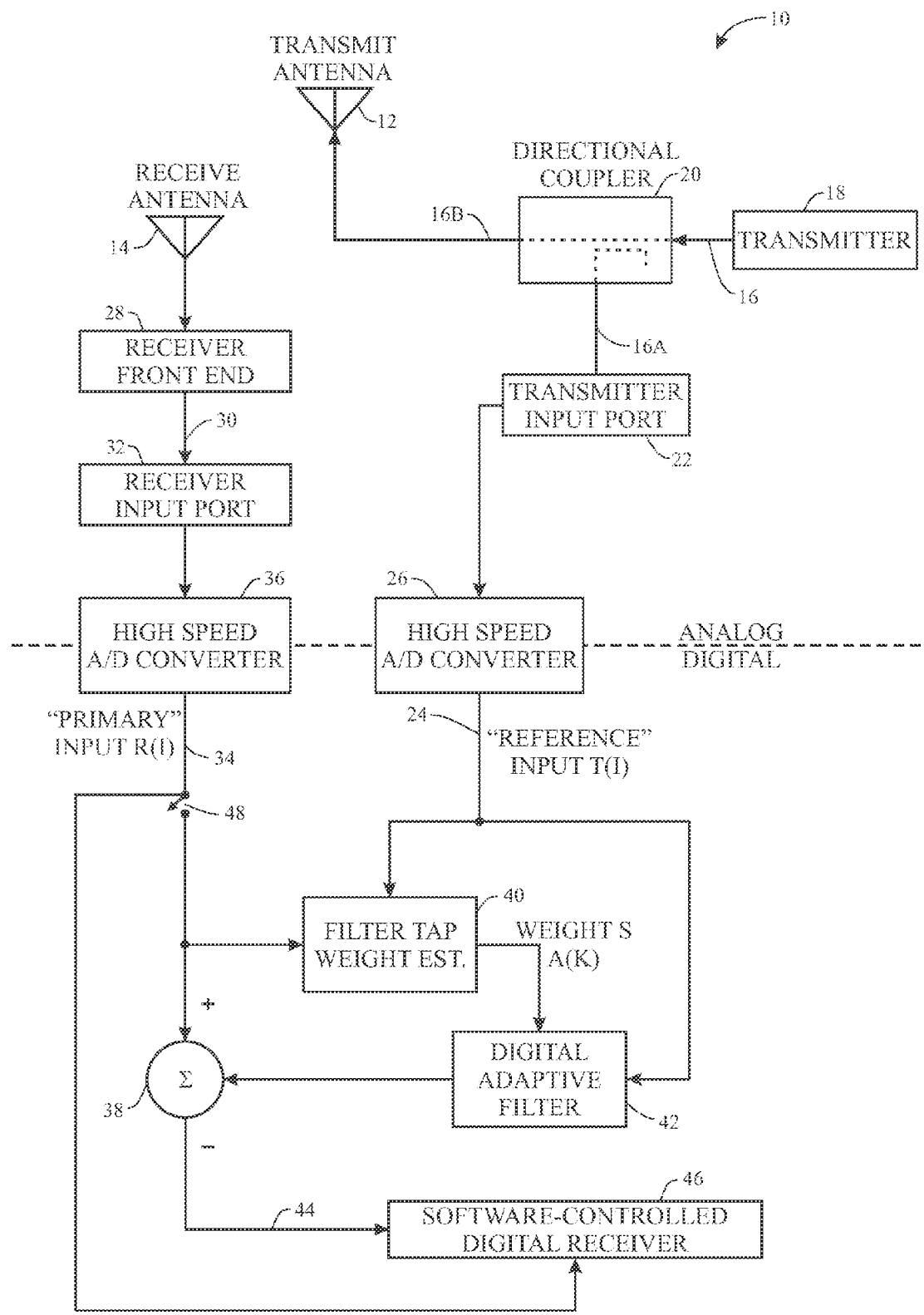
FIG. 1 illustrates an exemplary wireless communication system including a digital adaptive filter and filter tap weight estimator, in accordance with an embodiment of the present invention.

The present techniques provide methods and systems for full-duplex RF communication that are bandwidth-efficient and that maintain high throughput during real-time operation. The present techniques may be used in conjunction with the simultaneous operation of a transmitter and receiver on the same frequency from common or co-sited antennas. As provided, the techniques provide the advantage of full-duplex radio frequency communication without frequency-, time-, or code-division multiplexing and without the use of hardware RF cancellers. Such techniques may be useful for wireless communication, such a cellular communication, radio communication, broadcasting, short-range point-to-point communication such as microwave backhaul, wireless sensor networks, and wireless computer networks. Such techniques may also be applied to wire or cable-based communication, including telecommunications, computer networking, powerline carrier systems, twisted pair or coaxial cable communication, or DSL communication.

Signal interference between transmitted and received signals on co-sited or coupled antennas may result in a received signal including an interference component that is representative of the transmitted signal. During normal operation, the receiver input port will contain two signal components: a strong transmitted signal, and a significantly weaker received signal. Simple subtraction of the transmitted signal at the receiver end may be insufficient to eliminate this interference, because the version of the transmitted signal that is received has usually undergone some distortion. The received copy of the transmitted signal may be "corrupted" by the following effects: multipath reflected images of the original signal, phase distortion and amplitude changes, and delay. Accordingly, a simple subtraction may not account for the type and magnitude of the changes in the transmitted signal interference component of the received signal.

The present techniques provide a software-based adaptive filter to time-align and phase-align the "clean" transmitted signal sampled at a transmitter input port to a "corrupted" version present at the receiver input port on a subset of the incoming data frames. By running the canceller estimation algorithm on only a subset of incoming data frames, rather than on every frame, complexity of calculation operations can be greatly reduced such that real-time calculations can be made, while maintaining a statistically acceptable bit error rate (BER). As discussed further below, the subset of frames may be selected on a fixed basis (i.e., "decimation") or adaptively. In some embodiments, for non-selected frames, the filter may interpolate the canceller's filter coefficients from selected frames before and after the non-selected frames, in order to enhance time and phase alignment by estimating the values for the non-selected frames. The interpolation may be performed in either the time or frequency domain.

The present techniques may be implemented using high-speed analog-to-digital (A/D) converters and software-controlled digital signal processors. By using two 16-bit converters and a single loop adaptive filter algorithm, narrowband incoming signals that are 60 to 80 dB below the level of the transmitted signal may be decoded. Further, by calculating only a subset of the values for time and phase alignment and either repeating or interpolating to estimate the remaining values, the present techniques may have a reduced computation time compared to other full band cancellation techniques, allowing for their usage in real-time operation.

Referring to FIG. 1, an exemplary full-duplex RF communications system 10 is depicted that includes a transmit antenna 12 and a receive antenna 14. While a dual aperture system having separate receive and transmit antennas is illustrated, it will be appreciated that a single aperture system having a single transmit/receive duplex antenna and duplexer splitter/combiner, may also be implemented on the analog side of the system 10. In the transmitter portion of the system 10, a portion of the signal 16 from a transmit source (transmitter 18) is input to a directional coupler 20 to produce an attenuated signal 16a representative of the transmitted signal while the bulk of the signal 16b is input to the transmit antenna 12 and radiated as RF energy. The attenuated signal 16a is input to a transmitter input port 22 and is converted to a digital signal 24, known as the reference input signal t(i), by an A/D converter 26. The reference input signal (digital signal 24) comprises a series of data frames referred to herein as the "reference data frames."

In the receiver portion of the system, a radiated RF signal is picked up by the receive antenna 14 and passed through a receiver front end 28 to produce a received signal 30. In embodiments that involve cable or wire-based communication, a cable signal may be directly passed to the receiver front 28 without being picked up by the antenna 12. The receiver front end 28 may include analog amplifiers and/or filters, such as a wideband buffer amplifier. The received signal 30 is input to a receiver input port 32, which in an embodiment, may include hardware components such as an input jack, and is converted to a digital signal 34, known as the primary input signal r(i), by an A/D converter 36. The primary input signal (digital signal 34) comprises a series of data frames referred to herein as the "primary data frames." As will be appreciated, the primary data frames have a one-to-one correspondence with the reference data frames. That is, frame 1 of the reference input signal (digital signal 24) corresponds to frame 1 of the primary input signal (digital signal 34). Collectively, the series of primary data frames and the series of corresponding reference data frames may simply be referred to as "data frames" or "frames."

In embodiments, the received signal 30 and the attenuated signal 16a may be converted to digital signals by a single A/D converter, e.g., a high-speed multiport 16-bit converter, or by multiple A/D converters (as depicted in FIG. 1). The resulting digital signal 34 is then input to a summer 38 and adaptive filter tap weight estimator 40. The digital signal 24 is also input to estimator 40 and the digital adaptive filter 42. Tap weight estimator 40 periodically provides tap weight values to digital filter 42. Digital filter 42 provides an estimate of the transmitted signal that may be subtracted from the received signal with summer 38 to provide a cancelled signal 44. The resulting cancelled signal 44 may then be input to a software-controlled digital receiver 46 and may be further processed in any suitable manner. In an embodiment, the system 10 may include a bypass switch 48 for passing signal 30 directly to the receiver 46 without being processed by digital adaptive filter 42. For example, such an embodiment may be implemented if the transmitter 18 is turned off.

The digital adaptive filter 42 and summer 38 are software-controlled and may include a backward adaptive filter tap estimator or a block forward tap estimator, in embodiments. In one embodiment, the adaptive filter/summer difference equation is given by:

$$y(i) = r(i) - \sum_{k=0}^{M-1} a(k)t(i-k) \quad (1)$$

where y(i) are the output samples for each frame, r(i) are the receiver input port samples for each frame (also known as the primary input signal), t(i) are the transmitter input port samples for each frame (also known as the reference input signal), M is the length of the adaptive filter, and a(k) are the adaptive filter tap weights. The filter taps can be estimated by solution of the following matrix equation:

$$\begin{bmatrix} R_{tt}(0,0) & R_{tt}(0,1) & \ldots & R_{tt}(0,M-1) \\ R_{tt}(1,0) & R_{tt}(1,1) & \ldots & R_{tt}(1,M-1) \\ \ldots & \ldots & \ldots & \ldots \\ R_{tt}(M-1,0) & R_{tt}(1,M-1) & \ldots & R_{tt}(M-1,M-1) \end{bmatrix} \quad (2)$$

$$\begin{bmatrix} a(0) \\ a(1) \\ \ldots \\ a(M-1) \end{bmatrix} = \begin{bmatrix} R_{tr}(0) \\ R_{tr}(1) \\ \\ R_{tr}(M-1) \end{bmatrix}$$

where $$R_{tt}(j,k) = \sum_{i=M-1}^{N-1} t(i-j)t(i-k) \quad (3)$$

and $$R_{tr}(k) = \sum_{i=M-1}^{N-1} r(i)t(i-k) \quad (4)$$

and N is the length of the block of transmitter input port/receiver input port samples (data frames) over which to estimate the filter taps.

As noted above, the digital adaptive filter 42 may determine an estimate of the transmitted signal based on the tap weight values determined by the tap weight estimator 40. The tap weight values may be determined using either a backward adaptive filter tap estimator or block forward tap estimator, and may be calculated using equations 1-4, as stated above. However, determining the tap weight values for every data frame may require a significant amount of computation on behalf of the tap weight estimator 40. Indeed, in certain embodiments, the estimations may account for over 70% of the total operations of the combined functionalities of the tap weight estimator 40 and the digital adaptive filter 42.

To reduce the computational time and effort of the digital adaptive filter 42 and, specifically, the tap weight estimator 40, present embodiments may reduce the number of operations performed by the tap weight estimator 40. That is, rather than calculating the tap weight values for each data frame, or each sample of data, the tap weight estimator 40 may determine the tap weight values for only a portion of the data frames. For instance, in certain embodiments, the tap weight values may evolve slowly, and any changes may be more of a result of noise interference than major changes in signal characteristics. Accordingly, for such environments, the system 10 may be configured such that the tap weight estimator 40 only calculates tap weight values for a portion (or "subset") of the data frames based on the assumption that there are most likely only small changes in terms of the tap weight values from one data frame to another over a certain sampling period. For instance, in a completely unchanging and noiseless environment, the tap weight values would only need to be calculated one time, as this tap weight value would not change from frame-to-frame. While an unchanging and noiseless environment rarely occurs, the concept of periodically sampling over a fixed number of data frames may be employed to reduce the computational time and effort of the tap weight estimator 40. That is, if the tap weight values are slowly changing over time, a periodic update of the tap weight values may be enough to realize sufficient performance for adequate cancellation. By choosing an appropriate skip ratio (i.e., the number of frames between samples), the bit error rate (BER) can be maintained within an acceptable range (e.g., a BER less than $10^{-4}$).

In one embodiment, the system 10 may be configured such that the tap weight estimator 40 may calculate tap weight values on only a subset of the data frames of the digital signal 34 and the digital signal 24. This technique of recalculating the tap weight values on a repeating periodic basis (e.g., every N frames) is referred to herein as a "fixed pattern" or "decimation" operation or algorithm. In the fixed pattern operation, the system 10 may be configured such that the tap weight estimator 40 calculates the tap weight values every N data frames and "skips" the values for the data frames in between. That is, the tap weight values may be calculated for every N data frames. In one embodiment, a "repeat-frame" algorithm may be employed, wherein the tap weight values for the data frames between calculations is assumed to be the same as the last calculated tap weight value. Table 1 below depicts an example of the fixed pattern operation.

TABLE 1

| Fixed pattern operation | | | | |
|---|---|---|---|---|
| Frame 1 | Frame 2 | Frame 3 | . . . Frame N | Frame N + 1 |
| taps computed | Frame 1 taps | Frame 1 taps | Frame 1 taps | taps computed |

Thus, in the example illustrated in Table 1, a tap weight value may be calculated by the filter tap weight estimator 40 at Frame 1, using for instance, Equations (2)-(4). The tap weight values of Frame 2, Frame 3 . . . Frame N, are not recalculated. Instead the tap weight values for each of these data frames is assumed to be the same as the tap weight values of Frame 1. Every N data frames, the tap weight values are recalculated. Continuing with the example illustrated in Table 1, the tap weight value will be recalculated at Frame N+1. The tap weight values for the next subsequent data frames after Frame N+1 will be assumed to be the same as the tap weight values calculated for Frame N+1, using the presently described repeat-frame algorithm. The next tap weight values will be calculated at Frame 2N+1, and so forth. By recalculating the tap weight values on a periodic basis in a fixed pattern, and in this case simply repeating the tap weight values of the last calculated tap weight values for skipped frames (i.e., calculating only every N frames), the computational time and effort of the filter tap weight estimator 40 is greatly reduced such that the cancelling operations can occur in real time.

Figure 2:
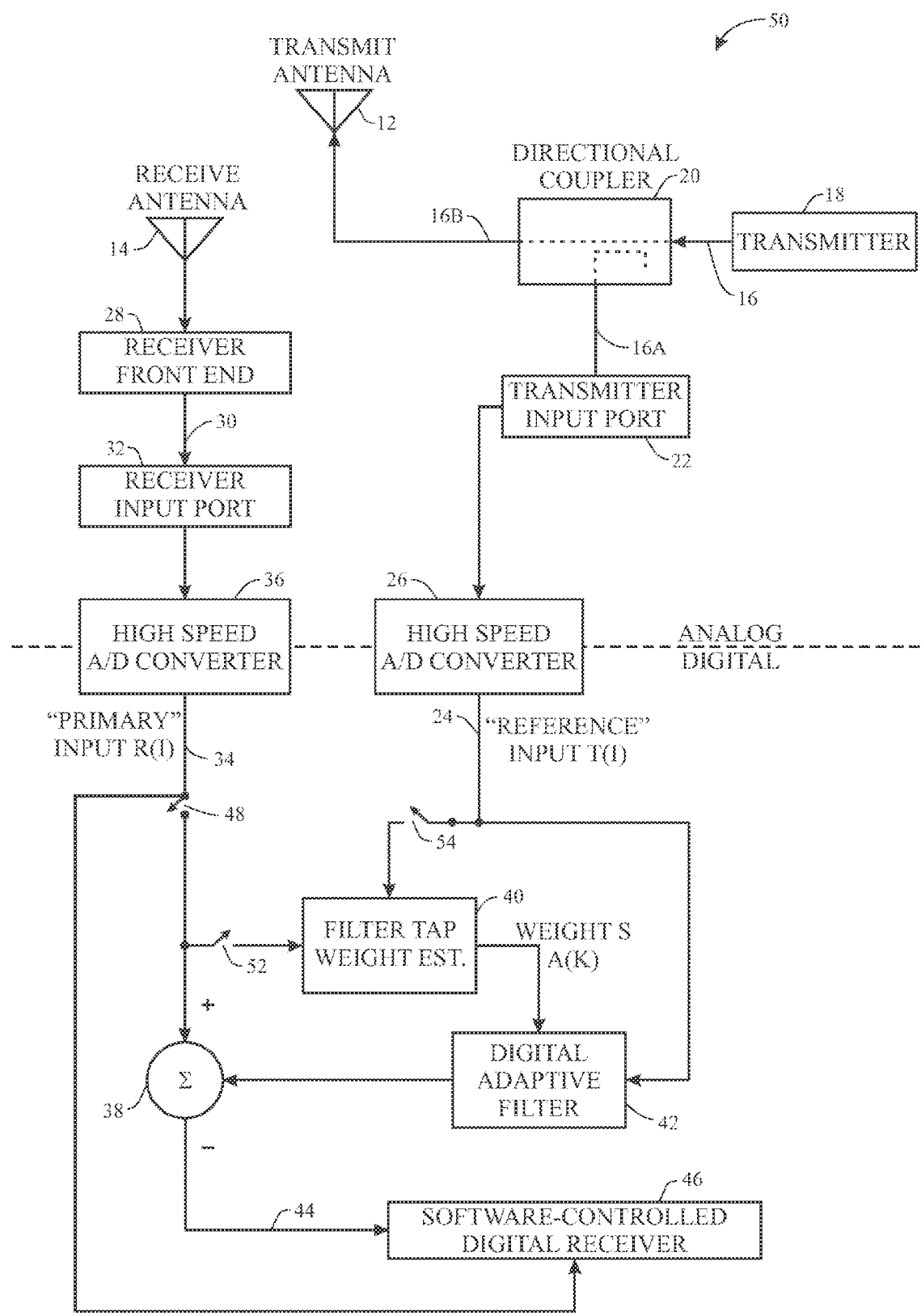
FIG. 2 illustrates an exemplary wireless communication system including a digital adaptive filter and filter tap weight estimator that may be configured to implement a repeat-frame fixed pattern calculation algorithm, in accordance with an embodiment of the present invention.

FIG. 2 illustrates a system 50 that may be configured to operate in accordance with a fixed pattern algorithm. The system 50 is analogous to the system 10 of FIG. 1 but illustrates one embodiment of implementing a fixed pattern operation. That is, as described above, the filter tap weight estimator 40 is only tasked with recalculating the tap weight values every N data frames. In accordance with one embodiment, to facilitate that periodic sampling of data frames and recalculation of the tap weight values every N data frames, switches 52 and 54 may be added to the input paths to the filter tap weight estimator 40 such that the digital receiver signal 34 and the digital signal 24 may be delivered to the filter tap weight estimator 40 every N frames, as previously described. In on example, the switches 52 and 54 may be closed periodically for one out of every N frames. The switches 52 and 54 are triggered by a modulo-N counter and may be implemented in software. Thus, in one embodiment, the tap weight estimator 40 only receives the data frames for which recalculation of the tap weight values is performed. Alternatively, the tap weight estimator 40 may receive all of the data frames but may only use the data frames for which recalculation of the tap weight values is desired (e.g., every N data frames).

While the fixed pattern operation described above for recalculating tap weight values only every N frames may be advantageous in certain environments (such as those environments wherein the tap weight values change slowly over time), using the previous values of the tap weight values for the skipped data frames (i.e., repeat-frame algorithm) may cause the resulting cancelled signal 44 of system 10 to degrade as the signal to interference ratio of the primary signal r(i) (digital signal 34) changes appreciably over the N frames. This may cause large fluctuations in the tap weight values between the data frames, thereby causing an error burst in the resulting signals.

Accordingly, in another embodiment, rather than using previous tap weight values for unsampled data frames (i.e., repeat-frame algorithm), the tap weight estimator 40 may be configured to interpolate the tap weight values for the skipped frames based on the computed values on both sides of the skipped data frame region. This technique of interpolating to estimate the unsampled data frames for which tap weight values are not recalculated (using Equations (2)-(4), for instance), may be referred to as an "interpolated-frame" algorithm. For example, returning to the example outlined in Table 1, a linear time-domain interpolation for the skipped frames may be expressed in the forms of equations (5) and (6), where $a_K(i)$ is the i-th canceller tap of the skipped frame, and K represents the skipped frame.

$$a_K(i) = (1 - \beta)a_1(i) + \beta a_{N+1}(i) \quad (5)$$

$$\beta = \frac{K-1}{N}; 1 \leq K \leq N \quad (6)$$

Table 2 illustrates an example of the referenced time-domain interpolation for a value of N=3 (i.e., skipping 2 frames between tap weight value calculations).

TABLE 2

Time Domain interpolation for N = 3

| Frame 1 | Frame 2 | Frame 3 | Frame 4 |
|---------|---------|---------|---------|
| $a_1(i)$ | 0.67 * $a_1(i)$ + 0.33 * $a_4(i)$ | 0.33 * $a_1(i)$ + 0.67 * $a_4(i)$ | $a_4(i)$ |

Although the interpolation of the tap weight values has been described in the time domain, it should be appreciated that the tap weight values, and their interpolation, may also be calculated within the frequency domain. Further, since the tap weight values are real-valued, the fast Fourier transform (FFT) output of the interpolations will be conjugate symmetric, thereby reducing the computation time of the tap weight estimator 40.

The interpolation techniques may be used in conjunction with the fixed pattern operation described above and may provide advantages over the repeat-frame techniques in environments in which the tap weight values change more rapidly. Instead of assuming that the tap weight values between calculated frames is the same as the previously calculated value, interpolation provides a mechanism for calculating a tap weight value before and after the skipped frame region (i.e., those frames for which a tap weight value was not calculated) and interpolating to estimate the values based on a change between the start and end of the skipped region.

As will be appreciated, repeating or interpolating the tap weight values may be done with a number of hardware elements commonly included in communications systems. For example, repeating tap weight values, especially in the fixed pattern operation, may be accomplished using one or more buffers within or associated with the tap weight estimator 40, if switches are not employed. Similarly, the various coefficients calculated for interpretation may also be stored in buffers or other low-level memory components associated with the tap weight estimator 40.

Figure 3:
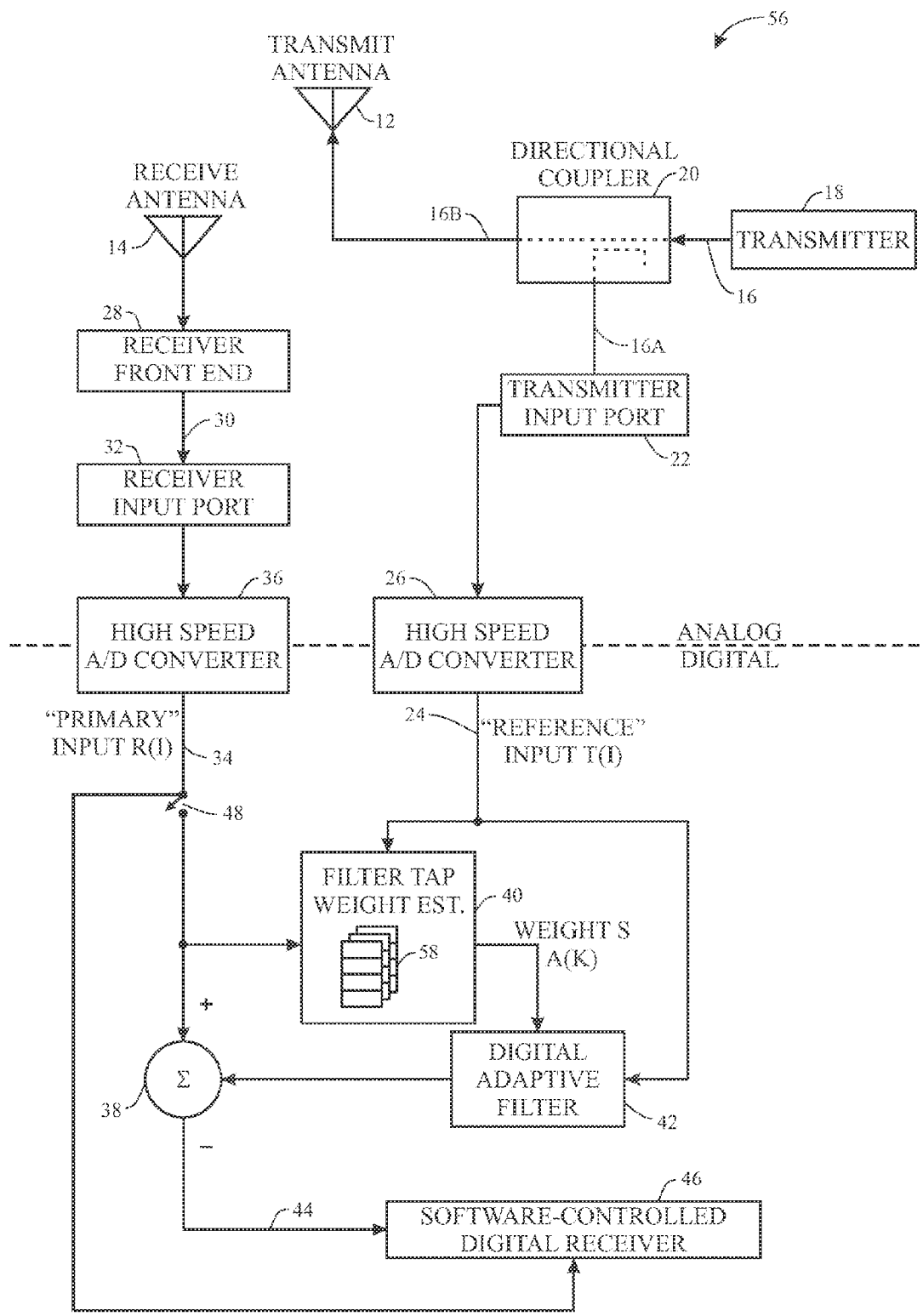
FIG. 3 illustrates an exemplary wireless communication system including a digital adaptive filter and filter tap weight estimator that may be configured to implement an interpolated-frame fixed pattern calculation algorithm, in accordance with an embodiment of the present invention.

FIG. 3 illustrates a system 56 that may incorporate the interpolated-frame techniques along with the fixed pattern operation described above. In order to implement the interpolation techniques, one or more memory components, such as buffers 58, may be provided. In the embodiment illustrated in FIG. 3, buffers 58 are added to the filter tap weight estimator 40. The buffers 58 are provided to store each data frame such that the data frames on each side of the skipped data frame region can be stored and used to interpolate to produce the tap weight values for the frames in the skipped data frame region. For instance, referring again to Table 2, Frames 1-4 may each be stored in the buffers 58. The filter tap weight estimator 40 may be used to calculate a tap weight value for Frame 1 and again for Frame 4. The tap weight values for Frames 2 and 3 are estimated by interpolating the tap weight values calculated from Frames 1 and 4, as indicated by Equations 5 and 6 and Table 2.

As will be appreciated, in alternative embodiments, the buffers 58 may be external to the filter tap weight estimator 40. For instance, buffers 58 may be provided external to the filter tap weight estimator 40, such that the digital receiver signal 34 and the digital signal 24 are delivered to the buffers 58 and only those values necessary for recalculating the tap weight values and interpolating (e.g., Frame 1 and Frame 4 in the previous example) are transmitted to the filter tap weight estimator 40. In certain embodiments, only those values necessary for recalculating the tap weight values and interpolating (e.g., Frame 1 and Frame 4 in the previous example) may be stored in buffers 58, while the skipped frame data values are not stored. That being said, the upsampled frame data (e.g. Frame 2 and Frame 3 in the previous example) must still be provided to adaptive digital filter 42 to produce cancelled signal 44.

In other embodiments, the tap weight estimator 40 may use an adaptive algorithm based on cancellation efficiency (CE) rather than using a fixed pattern algorithm (with or without interpolation). That is, the tap weight estimator 40 may define the measured cancellation efficiency (MCE) as the ratio of the signal level of the canceller input to the signal level of the canceller output, with a larger ratio indicating better cancellation. The tap weight estimator 40 may then re-compute the tap weight values only when the MCE becomes sufficiently low, based on a predefined threshold value.

Figure 4:
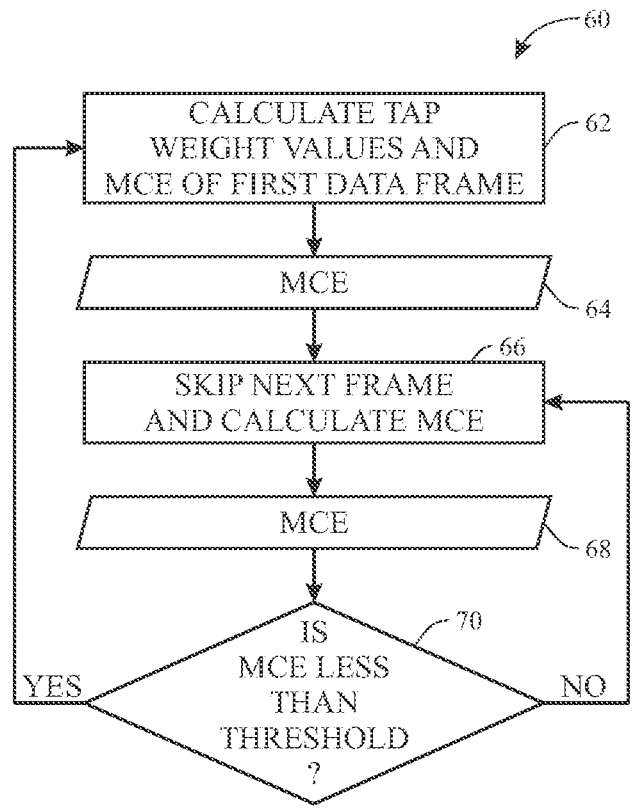
FIG. 4 illustrates a process for implementing an adaptive pattern algorithm, in accordance with an embodiment of the present invention.

FIG. 4 illustrates a process 60 for implementing the adaptive algorithm, utilizing the systems 10, 50 or 56, for instance. At the beginning of operation, in block 62 the tap weight estimator 40 may compute the tap weight values for the first data frame and calculate the MCE 64. For the next data frames, the tap weight estimator 40 may either repeat the previous tap weight values or interpolate to estimate the tap weight values. That is, at block 66, the tap weight estimator 40 may skip the next data frame and calculate the MCE 68. At block 70, the tap weight estimator 40 may compare the MCE 68 to a threshold (e.g., as low as 0.25 to 0.50 dB). If the MCE 68 is above the threshold, the tap weight estimator 40 may return to block 66 and skip the next data frame. If the MCE 68 is less than the threshold, then the tap weight estimator 40 may return to block 62 and recalculate the tap weight values. Although certain embodiments of the adaptive algorithm using interpolation may require larger amounts of memory because the time between updating the tap weight values is not known a priori, the tap weight estimator 40 may implement a number of mitigating solutions, such as limiting the number of frames in storage and reverting to repeating tap weight values rather than interpolating until the next update as storage is exhausted if an adaptive algorithm using interpolation is implemented.

Another possible embodiment for adapting the tap weight update interval could be derived by measuring the computational load and/or power consumption of the implementation platform. If the implementation platform is shared by multiple functions (such as the software-controlled digital receiver 46) that have time-varying computational requirements, then the update interval could be lengthened to reduce the overall computational load during times of heavy activity. In this fashion, the MCE performance would be consistent with the available resources.

Figure 5:
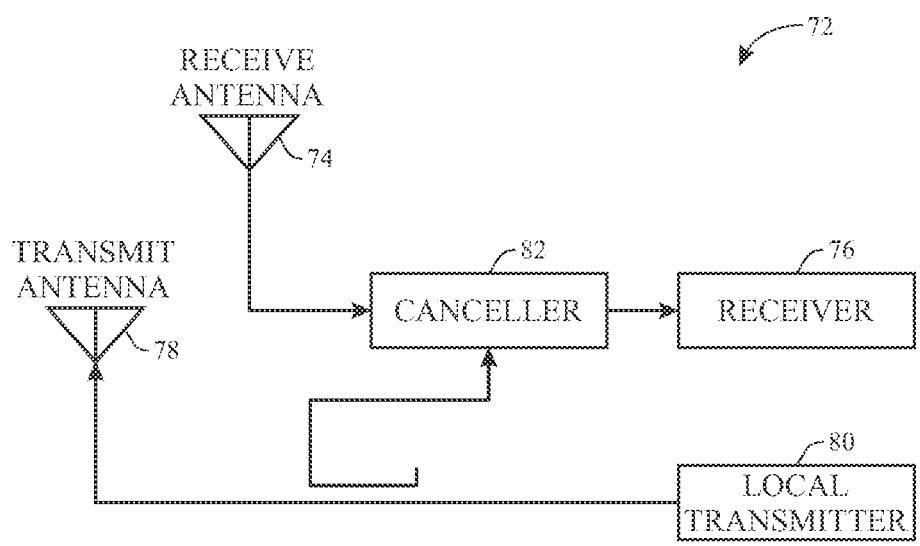
FIG. 5 illustrates a dual aperture test system that was employed to test the disclosed features, in accordance with embodiments of the present invention.

The fixed pattern system described above was constructed and both the repeat-frame and interpolated-frame algorithms described above were tested. FIG. 5 illustrates the test system 72 that was constructed in offline software and through which the performance of the algorithms was tested via bit error rate (BER). All data used in the presently described test was collected from the dual-aperture architecture of FIG. 5, using separate receive and transmit antennas, similar to the dual aperture system described and illustrated with regard to FIG. 1. Accordingly, the test system 72 includes a receive antenna 74 and a receiver 76, as well as transmit antenna 78 and a transmitter 92. The canceller 82 represents that model of the digital side of the system that includes the components used to sample and calculate the tap weight values.

For the evaluation, the transmission modulation was FSK (frequency shift keying) at 100 kb/sec and +/−65 kHz deviation. The FSK receiver 76 was an incoherent arctangent-based discriminator. The A/Ds in the canceller 82 were 16 bits wide, and the sampling frequency was 100 MHz.

Data was collected at signal-to-interference ratios (SIR) between −50 and −70 dB. Frame skip ratios of N=1, 2, 3, 4, 5, 6, 8, 10, 15, 20, and 30 were employed. (For the case of N=1, all frames are computed, as there are no skipped frames.) From −50 to −60 dB SIR, no errors were observed for any of the frame skip ratios. At −62 dB SIR, errors were observed starting at a skip ratio of N=5 for the repeated frame algorithm, and N=8 for the interpolated frame algorithm. At −64 dB SIR, the interpolated frame algorithm had no degradation from the non-skip case of N=1 at N=2, 3, and 4. In fact, the interpolated algorithm performed up to 28 times better than the repeat algorithm at N=4. Table 3 shows the skip ratio versus BER for −64 dB. The column labeled "Improvement" shows the ratio of the repeat algorithm BER to the interpolation algorithm BER. In the test system 72, the data indicated that the interpolated algorithm was better than the repeat algorithm for all skip ratios except for 30.

TABLE 3

Skip Ratio vs. BER for Repeat and Interpolated Frame Algorithm

| skip | SIR | Repeat BER | Interp BER | Improvement |
|---|---|---|---|---|
| 1 | −64 | 3.57143E−05 | 3.57143E−05 | 1.000 |
| 2 | −64 | 7.14286E−05 | 3.57143E−05 | 2.000 |
| 3 | −64 | 2.85714E−04 | 0.00000E+00 | Infinite |
| 4 | −64 | 1.00000E−03 | 3.57143E−05 | 28.000 |
| 5 | −64 | 9.25926E−04 | 7.14286E−05 | 12.963 |
| 6 | −64 | 2.50000E−03 | 1.53846E−04 | 16.250 |
| 8 | −64 | 1.37037E−03 | 6.53846E−04 | 2.096 |
| 10 | −64 | 3.70370E−03 | 7.69231E−04 | 4.815 |
| 15 | −64 | 2.44444E−03 | 1.16667E−03 | 2.095 |
| 20 | −64 | 3.59259E−03 | 2.26923E−03 | 1.583 |
| 30 | −64 | 2.11111E−03 | 2.86364E−03 | 0.737 |

The results of the tests indicated in Table 3 are illustrated in FIG. 6. That is, the graph 84 illustrates a plot of the BER at various skip ratios for implementation of both the repeat-frame algorithm and the interpolated-frame algorithm. The repeat-frame BER is illustrated by plot 86 and the interpolated-frame BER is illustrated by plot 88. The test data is useful in illustrating the level of BERs using various skip rates and the fact that acceptable levels of BERs can be achieved even when tap weight values are not calculated for every data frame. For instance, if a bit error rate of $10^{-4}$ is the acceptable threshold, a skip rate of 5 produced an acceptable BER using the repeat-frame algorithm in the test system 72. A skip rate of 6 produced an acceptable BER using the interpolated-frame algorithm in the test system 72.

As will be appreciated, while the disclosed concepts of reducing the computational functions of the filter tap weight estimator 40 by calculating a tap weight value on only a subset of data frames via either fixed pattern operation or adaptive operation and filling in the uncalculated tap weight values using either repeating values or interpolation, the disclosed techniques may be used with various other systems, as well. For instance, the disclosed techniques could be employed in a full-duplex RF communications system wherein the received signal spectrum may be divided prior to digital processing. For example, in alternative systems, the entire wideband sampled spectrum may be divided into multiple bands, and a separate cancellation solution (e.g. adaptive filter processing) may be performed on each band. Such systems might employ an efficient Quadrature Mirror Filter (QMF) structure, for instance, to perform the band separation of digital signals 34 and 24. The bands may be processed independently using multiple filter tap weight estimators 40 and digital adaptive filters 42, one for each band, for instance. The resulting cancellation solutions from each independent band calculation may be recombined by the software-controlled digital receiver 46.

In alternative embodiments, a system which may incorporate the disclosed concepts to reduce computational functions of the filter tap weight estimator 40 may include a wireless communication architecture in which the digital adaptive filter 42 is placed at the end of the software radio chain, either on the I/Q baseband signals or after the demodulation algorithm. As with the communications system 10 of FIG. 1, this alternative system may include a transmit antenna 12 and a receive antenna 14. In the transmitter portion of the system, the signal 16 from transmitter 18 may be modulated by a modulator and such that the modulated signal is input to the directional coupler 20 to produce an attenuated signal 16a representative of the transmitted signal while the bulk of the signal 16b is input to a transmit antenna 12 and radiated as RF energy, as previously described with regard to FIG. 1. The attenuated signal 16a is input to a transmitter input port 22 and is converted to a digital signal 30 by A/D converter 26.

Also as described with regard to FIG. 1, the receive antenna 14 produces a received signal 30 that is input to a receiver front end 28 and/or receiver input port 32 and is converted to a digital signal 34 by A/D converter 36. In the presently described alternative system, if the demodulation is coherent, then two independent carrier recovery algorithms may be used for separately downconverted transmitter input port and receiver input port, "I" and "Q," signals, respectively. In other embodiments the cancellation can occur after downconversion of the I and Q signals (but before demodulation), or that cancellation can occur after downconversion and demodulation. The digital signal 34 may be input to a downconverter/demodulator prior to being input to a summer 38 and tap weight estimator 40. The digital attenuated signal 30, may be input to a second downconverter/demodulator prior to being input to the digital adaptive filter 42 and tap weight estimator 40. The resulting cancelled signal may be passed to a digital detector.

FIG. 7 illustrates one embodiment of a hardware system intended to represent a broad category of computer systems such as personal computers, workstations, and/or embedded systems that may be used in conjunction with the present techniques. In embodiments, it is envisioned that the system (e.g., the system 10) may include an external control that may include certain hardware and software components for implementing the present techniques, including control of the individual components of system. In the illustrated embodiment, the hardware system includes processor 84 and mass storage device 86 coupled to high speed bus 88. A user interface device 90 may also be coupled to the bus 88. User interface devices may include a display device, a keyboard, one or more external network interfaces, etc. An input/output device 92 may also be coupled to the bus 88. In an embodiment, the user interface, for example the display, may communicate certain information related to the status of the operation of the adaptive filter. For example, the display may display information relating to the quality of the adaptive filter cancellation. In embodiments in which the quality is compromised, an operator may choose to bypass the adaptive filter 42 and proceed directly to the software-controlled receiver 46 with bypass switch 48.

Certain embodiments may include additional components, may not require all of the above components, or may combine one or more components. For instance, mass storage device 86 may be on-chip with processor 84. Additionally, the mass storage device 86 may include an electrically erasable programmable read only memory (EEPROM), wherein software routines are executed in place from the EEPROM. Some implementations may employ a single bus, to which all of the components are coupled, or one or more additional buses and bus bridges to which various additional components can be coupled. Additional components may include additional processors, a CD ROM drive, additional memories, and other peripheral components.

In one embodiment, the present techniques may be implemented using one or more computers such as the hardware system of FIG. 7. Where more than one computer is used, the systems can be coupled to communicate over an external network, such as a local area network (LAN), an internet protocol (IP) network, etc. In one embodiment, the techniques may be implemented as software routines executed by one or more execution units within the computer(s). For a given computer, the software routines can be stored on a storage device, such as mass storage device 86.

As shown in FIG. 8, the software routines can be machine executable instructions 94 stored using any machine readable storage medium 96, such as a diskette, CD-ROM, magnetic tape, digital video or versatile disk (DVD), laser disk, ROM, Flash memory, etc. The series of instructions may be received from a remote storage device, such as a server on a network, a CD ROM device, a floppy disk, etc., through, for instance, I/O device(s) 92 of FIG. 7. From whatever source, the instructions may be copied from the storage device into memory 86 and then accessed and executed by processor 84. In embodiments, it is envisioned that the software routines may be installed as an update package for an existing wireless communication systems.

In embodiments, a communication system, such as the system 10, may be part of a network that may include multiple nodes, each node including a system 10. The nodes may be interconnected with any suitable connection architecture and may be controlled, in embodiments, from a central station. For example, a network may include a cellular communication network. In such embodiments, each node or a subset of the nodes in the network may employ the digital adaptive filtering technique as provided herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method comprising:
   converting an analog primary signal into a digital primary signal comprising a plurality of primary data frames;
   converting an analog reference signal into a digital reference signal comprising a plurality of reference data frames, wherein each of the plurality of reference data frames corresponds to one of the plurality of primary data frames, wherein the subset of reference data frames and the subset of primary data frames is selected on a fixed pattern every N data frames where N is greater than 1, and wherein at least one unselected data frame is present between the N data frames; and
   processing the digital reference signal with a digital adaptive filter, wherein the digital adaptive filter uses the digital reference signal and the digital primary signal as inputs for determining tap weight values of the digital adaptive filter to provide an output and wherein a tap weight estimator calculates the tap weight values for only a subset of the plurality of reference data frames and a corresponding subset of the plurality of the primary data frames; and subtracting the output of the digital adaptive filter from the digital primary signal to generate a digital cancelled signal.

2. The method of claim 1, comprising assigning, at the tap weight estimator, a tap weight value to each of the at least one unselected data frame.

3. The method of claim 2, wherein assigning the tap weight value to each of the at least one unelected data frames comprises utilizing a repeat-frame algorithm.

4. The method of claim 2, wherein assigning the tap weight value to each of the at least one unelected data frames comprises utilizing an interpolation-frame algorithm.

5. The method of claim 1, wherein the tap weight estimator is configured to use an adaptive algorithm based on cancellation efficiency to determine the subset of the plurality of the reference data frames and the subset of the plurality of primary data frames on which to calculate the tap weight values.

6. The method of claim 1, comprising separating bands of one or both of the digital primary signal or the digital reference signal prior to processing the digital primary signal with a Quadrature Mirror Filter (QMF) structure.

7. The method of claim 1, comprising downconverting and demodulating the digital primary signal and the digital reference signal prior to processing the digital reference signal.

8. The method of claim 1, comprising receiving the analog primary signal comprises receiving the analog primary signal from a receiver front end, an antenna, or a receiver input port.

9. A method comprising:

transmitting, from one or more analog-to-digital converters, one or more digital signals collectively comprising a plurality of data frames;

calculating, using a tap weight estimator, tap weight values for only a subset of the plurality of data frames, wherein calculating comprises calculating the tap weight values for only a subset of the plurality of data frames, wherein the subset comprises a fixed pattern of N data frames where N is greater than 1;

estimating, using the tap weight estimator, a tap weight value for each of the plurality of data frames not in the subset; and generating, using a digital adaptive filter, a digital cancelled signal using the calculated tap weight values and the estimated tap weight values.

10. The method of claim 9, wherein estimating comprises assigning the tap weight value for each of the plurality of data frames not in the subset a tap weight value equal to the most recent previously calculated tap weight value in the subset of the plurality of data frames.

11. The method of claim 9, wherein estimating comprises interpolating a first calculated tap weight value from the subset and a second calculated tap weight value from the subset to estimate the tap weight values of the plurality of data frames between each of the first calculated tap weight value and the second calculated tap weight value.

12. The method of claim 9, wherein calculating comprises calculating the tap weight values for only a subset of the plurality of data frames using an adaptive algorithm based on cancellation.

13. The method of claim 9, further comprising receiving the plurality of data frames at one or more switches and transmitting only the subset of the plurality of data frames to the tap weight estimator.

14. The method of claim 9, wherein transmitting comprises transmitting the plurality of data frames to one or more buffers before calculating and estimating the tap weight values.

15. A full-duplex wireless communication system comprising:

a receiver front end, an antenna, or a receiver input port capable of receiving an analog primary signal;

a transmitter capable of transmitting an analog transmitted signal;

a directional coupler capable of sampling a portion of the analog transmitted signal to provide an analog reference signal;

a first analog to digital converter capable of converting the analog primary signal into a digital primary signal;

a second analog to digital converter capable of converting the analog reference signal into a digital reference signal;

an adaptive filter configured to process the digital reference signal;

a tap weight estimator coupled to the adaptive filter and configured to use the digital reference and primary signals as inputs for calculating tap weight values of the adaptive filter to provide an output, wherein the system is configured such that the tap weight estimator calculates only a portion of the tap weight values for the digital reference and primary signals, wherein the tap weight estimator is configured to use a fixed pattern algorithm to calculate the tap weight values; and a summer configured to subtract the output of the adaptive filter from the digital primary signal to generate a digital cancelled signal.

16. The system of claim 15, wherein the adaptive filter size is in the range of 5 to 32 taps.

17. The system of claim 15, wherein the tap weight estimator is configured to utilize a repeat-frame algorithm to estimate the tap weight values of the portion of the tap weight values not calculated by the tap weight estimator.

18. The system of claim 15, wherein the tap weight estimator is configured to utilize an interpolated-frame algorithm to estimate the tap weight values of the portion of the tap weight values not calculated by the tap weight estimator.

19. A full-duplex wireless communication system comprising:

a receiver front end, an antenna, or a receiver input port capable of receiving an analog primary signal;

a transmitter capable of transmitting an analog transmitted signal;

a directional coupler capable of sampling a portion of the analog transmitted signal to provide an analog reference signal;

a first analog to digital converter capable of converting the analog primary signal into a digital primary signal;

a second analog to digital converter capable of converting the analog reference signal into a digital reference signal;

an adaptive filter configured to process the digital reference signal;

a tap weight estimator coupled to the adaptive filter and configured to use the digital reference and primary signals as inputs for calculating tap weight values of the adaptive filter to provide an output, wherein the system is configured such that the tap weight estimator calculates only a portion of the tap weight values for the digital reference and primary signals, wherein the tap weight estimator is configured to use an adaptive pattern algorithm to calculate the tap weight values based on cancellation efficiency to determine the filter weights; and a summer configured to subtract the output of the adaptive filter from the digital primary signal to generate a digital cancelled signal.

20. The system of claim 15, wherein one or both of the first analog to digital converter or the second analog to digital converter comprises a high speed analog to digital converter.

21. The system of claim 15, wherein the system comprises a cellular communication system.

22. The system of claim 15, wherein the system comprises a cable or wire-based communication system.

23. system of claim 15, wherein the system is part of a network, comprising a plurality of the full-duplex wireless communications systems.

24. A full-duplex wireless communication system comprising:

a receiver front end, an antenna, or a receiver input port capable of receiving an analog primary signal;

a transmitter capable of transmitting an analog transmitted signal;

a directional coupler capable of sampling a portion of the analog transmitted signal to provide an analog reference signal;

a first analog to digital converter capable of converting the analog primary signal into a digital primary signal;

a second analog to digital converter capable of converting the analog reference signal into a digital reference signal;

an adaptive filter configured to process the digital reference signal;

a tap weight estimator coupled to the adaptive filter and configured to use the digital reference and primary signals as inputs for calculating tap weight values of the adaptive filter to provide an output, wherein the system is configured such that the tap weight estimator calculates only a portion of the tap weight values for the digital reference and primary signals;

a summer configured to subtract the output of the adaptive filter from the digital primary signal to generate a digital cancelled signal; and one or more switches arranged to control transmission of the digital reference and primary signals to the tap weight estimator such that the system is configured to operate the one or more switches to transmit only the portions of the digital reference and primary signals for which the portion of the tap weight values is to be calculated.

25. The system of claim 24, comprising one or more buffers configured to store data frames from each of the digital reference and primary signals before the tap weight estimator calculates the tap weight values.

* * * * *